Sept. 26, 1933.        F. M. MILLER        1,928,338
SPOTLIGHT SIGNAL
Filed Jan. 15, 1932        3 Sheets-Sheet 1
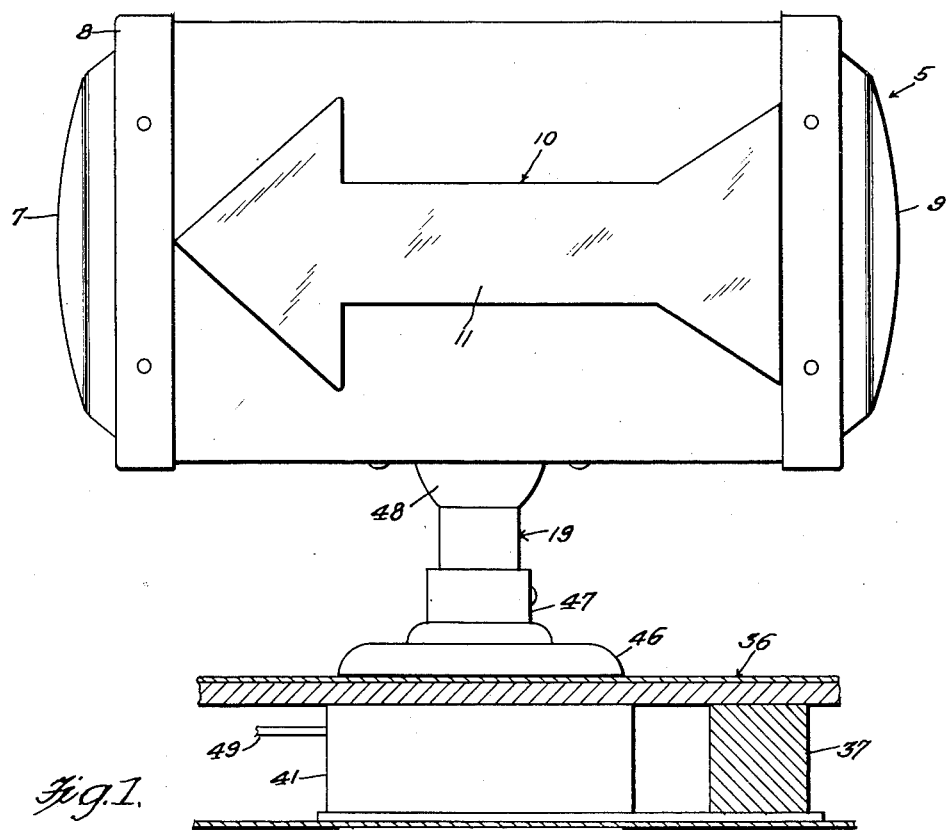
Fig. 1.
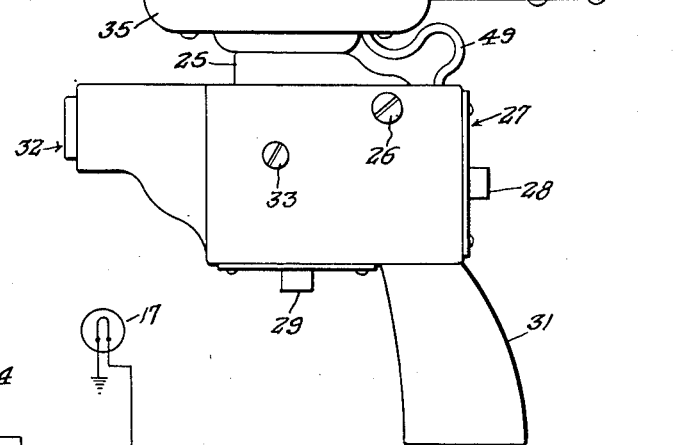
Fig. 8.
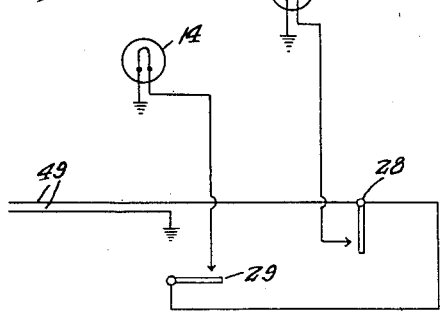
Inventor
Frieda M. Miller,
By Clarence A. O'Brien,
Attorney

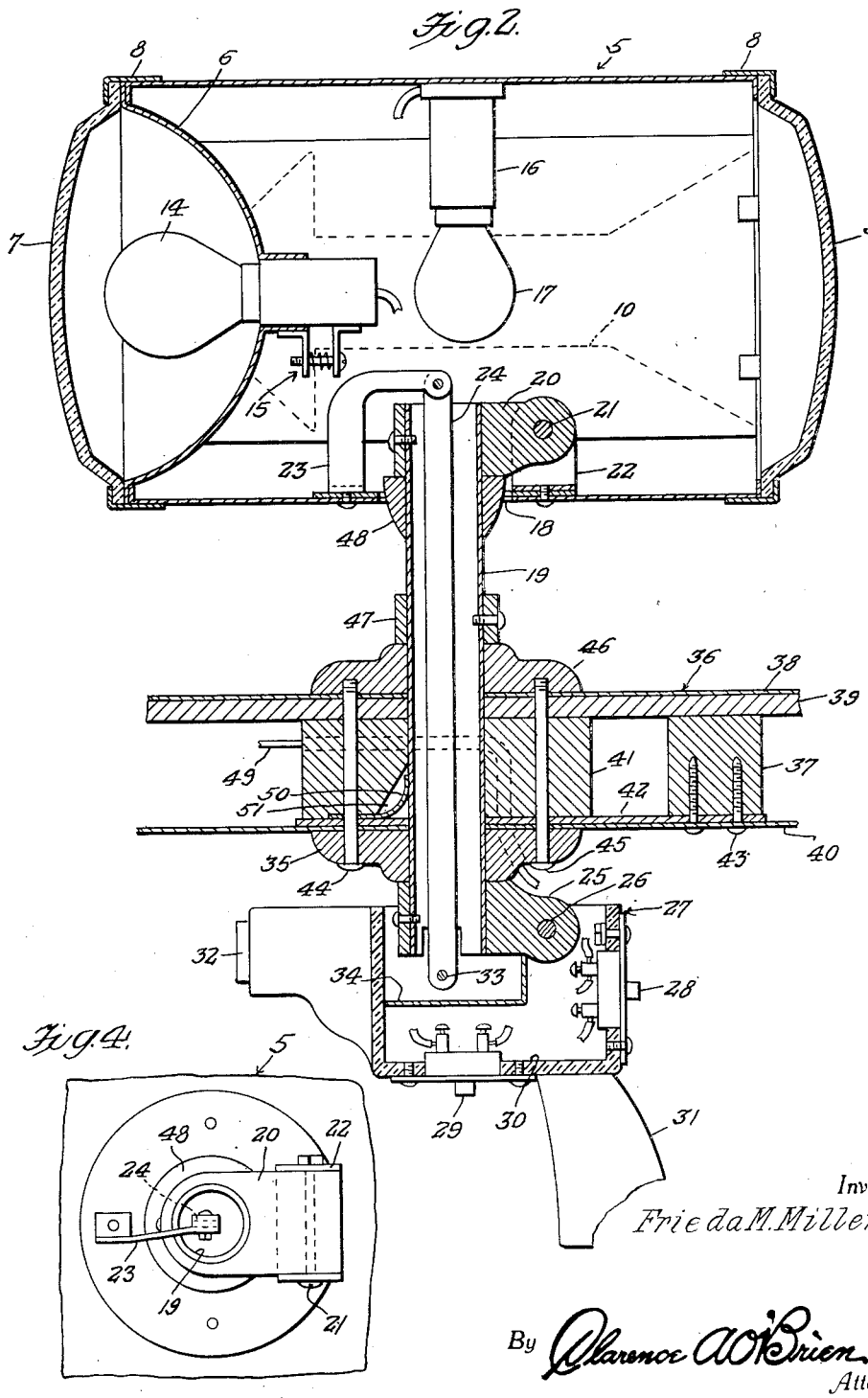

Sept. 26, 1933.   F. M. MILLER   1,928,338
SPOTLIGHT SIGNAL
Filed Jan. 15, 1932   3 Sheets-Sheet 3
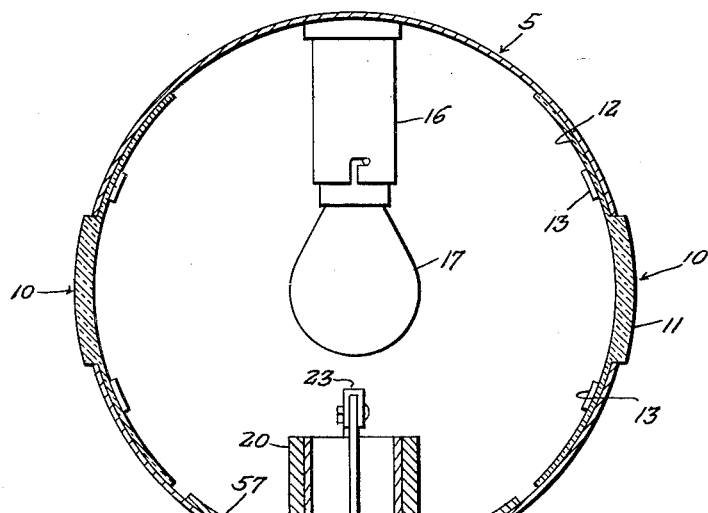
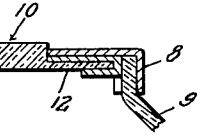
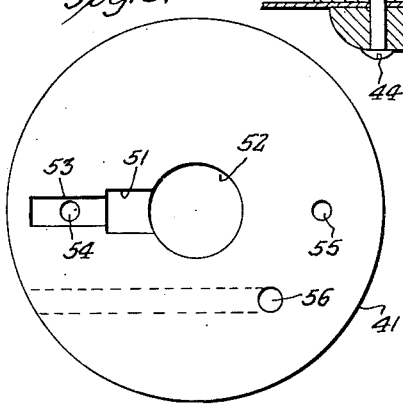
Inventor
Frieda M. Miller,
By Clarence A. O'Brien
Attorney Patented Sept. 26, 1933

1,928,338

UNITED STATES PATENT OFFICE 1,928,338

SPOTLIGHT SIGNAL

Frieda M. Miller, Flint, Mich.

Application January 15, 1932. Serial No. 586,823

11 Claims. (Cl. 116—48)

My invention relates to a novel and improved spotlight structure for mounting upon a vehicle and provided with means whereby it partakes of the character of a direction signal.

It is an important object of my invention to provide a device of this kind which provides in a single, unified structure a direction indicator and spotlight manually controllable and shiftable.

It is also an object of my invention to provide a device of the kind described which may be operated to illuminate areas to the rear or to the fore, or to one side or the other, of a vehicle upon which it may be mounted, so as to function as a spotlight, a trouble lamp, or back up light, and for other uses.

It is also an important object of my invention to provide a device of the character described which is specially adapted to be mounted in the roof of a closed automobile or the like and to the rear of the windshield or the like and to have means extending into the interior of the automobile within easy control of the operator.

It is also an important object of my invention to provide in a structure of the type described above means for indicating to the operator that the same is in operation and the direction in which it is pointed.

It is also an important object of my invention to provide a device of the character described in simplified, inexpensive and easily manufactured form which is nevertheless rugged and serviceable and easily and conveniently operable.

Other objects and advantages of my invention will be apparent from the following description and the drawings wherein for purposes of illustration I have shown a preferred embodiment.

In the drawings:

Figure 1 is a general side elevational view of the device of the invention showing in section a part of the vehicle roof in which it is to be mounted.

Figure 2 is a vertical longitudinal section through Figure 1.

Figure 3 is a vertical transverse section through Figure 1.

Figure 4 is a top plan view of a part of the interior of the light casing.

Figure 5 is a bottom plan view of a spacing block.

Figure 6 is a view of one of the members for resisting the rotation of the movable part of the device of my invention, and Figure 7 is a horizontal sectional view of part of the side lens construction, and Figure 8 is a diagrammatic view of the wiring system of the device.

In the drawings, wherein for the purpose of illustration I have shown a preferred embodiment, and wherein like numerals refer to like parts throughout the same, the numeral 5 refers generally to a normally horizontal tubular body or drum which carries in its forward end the spotlight reflector 6 which is provided with a suitable convex lens 7 held to the end of the drum by a suitable retaining means 8. Similarly carried in the other or rear end of the drum 5 is a red convex lens 9, and at either side, and disposed in horizontal manner are green or other colored lenses 10, the ends of which are held by the retaining means 8 in the manner shown in Figure 7. The arrow lenses have thickened portions 11 which protrude through conforming openings in the sides of the drum 5, so that the reduced flanges 12 resulting by this formation engage the interior surface of the drum and are held by suitable clips 13 or the like as seen in Figures 3 and 7. The center of the reflector 6 carries a conventional bulb 14 with focus adjusting structure generally referred to by the numeral 15. The top of the drum carries a depending socket provided with a bulb 17 which is thereby disposed approximately on the central longitudinal axis of the drum at approximately intermediate the ends thereof.

An opening 18 in the drum 5, below the bulb 17 is provided to receive the upper end of a tube 19 provided with a laterally projected bracket 20 pivoted on a pin 21 horizontally and transversely carried by a bracket 22 attached to the interior of the bottom of the drum, and to the rear of the opening 18. Forward of the opening 18 there is provided an L-shaped bracket 23 which pivotally carries the upper end of a tie rod 24 which depends within and in spaced relation with the sides of the tube 19. Upon the lower end of the tube 19 is carried a bracket 25 similar in form and disposition to the bracket 20. The bracket 25 is hinged on a pin 26 transversely disposed to the rear of the tube 19 in a generally rectangular casing 27, of aluminum or other diecast material which carries in its vertical rear wall a suitable type of slice toggle or push button switch 28 and in its bottom another similar switch 29. Between the switch 29 and the rear end of the bottom 30 of the casing 27 there depends a pistol grip 31. On the forward wall of the casing 27 is provided a nose 32 in imitation of a pistol barrel or direction pointer. The lower end of the tie rod 24 is pivotally anchored as at 33 in the forward part of the casing 27, and immediately below the pivot 33 is a reflecting medium 34 adapted to reflect the light from the bulb 17 which passes down the tube 19 through the open top of the casing 27 against a decorative mounting plate or bearing block 35 which is designed to be secured to the under surface of the interior of the roof of an automobile or the like. This reflecting feature advises the operator when the device is in operation. It should be stated that the lower end of the rod 24 reaches below the lower end of the tube 19 as shown.

The numeral 36 refers generally to an automobile roof structure, the numeral 37 to a roof bow, the numeral 38 to the outer or top material, and the numeral 39 to the slats, the numeral 40 to the interior covering, and the numeral 41 to a suitable spacing or support block, and the numeral 42 to a suitable reinforcing plate which is to be attached to the bow 37 by means of the screws 43. Long screws 44, 45 are passed upwardly through the mounting plate 35 through the spacer block 41 and into another mounting plate or bearing block 46 secured thereby in abutment with the top material 38 or the exterior of the top of the automobile or the like.

A sleeve 47 is provided to adjust end play and is arranged to engage the mounting plate 46 as shown. A suitable enlargement 48 is provided on the tube 19 with exterior surfaces within the opening 18 of the drum 5' for improving the appearance of the structure. The upper surface of the bracket 25, which like the bracket 20 surrounds the tube 19 rotatably engages the lower mounting plate 35 and the lower surface of the sleeve 47 engages the upper mounting plate 46.

One of the necessary conduits 49 is led through the spacing block 41 in the angular manner shown and comes out at the other side of the block for entering the casing 27. As seen, the conduit 49 is extended between the upper and lower members of the roof construction. Suitable conduits extend upwardly through the tube 19 to the bulbs 14 and 17. The wiring diagram of Figure 8 discloses suitable connections which are obvious therefrom.

A J-shaped spring 50 is secured upon the reinforcing plate 42 in a recess 51 opening into the center bore 52 in the spacer block 41 so that it engages the side of the tube 19 and prevents idle rotation thereof. Another small recess 53 opens into the recess 51 to accommodate in an obvious manner the shank 54 of the spring 50. It will be observed that the screw 44 operates to hold the spring 50. Holes 54 and 55 accommodate the assembling screws 44 and 45 while the numeral 56 generally designates the lower end opening of the passage provided for the conduit 49. The numeral 57 denotes an arcuate reinforcing plate upon which the brackets 23 and 22 are mounted within and upon the bottom of the drum 5.

It will be obvious that operating the switch 28 will illuminate the bulb 17 so as to show the arrows 10 on each side of the drum as well as the red lens 9 in the rear, that the switch 29 may be operated to illuminate the bulb 14 so as to bring the spotlight into action, and that the switches 28 and 29 may be operated simultaneously so as to operate the signal and the spotlight simultaneously, or either one of them may be operated while the other is in inoperative position, according to the requirements and the desires of the operator.

It is believed to be obvious that rotating the casing 27 through the application of the hand to the pistol grip 31 will cause rotation of the drum on its vertical axis, and that forward and backward actuation of the pistol grip 31 will, through the agency of the tie rod 24, move the drum 5 up and down on the axis of the hinge pin 21 so as to raise or depress the spotlight and simultaneously rotating it if desired, so as to give it the desired direction.

While I have shown a preferred embodiment of the invention, it is to be defintely understood that I do not desire to limit the application to this embodiment but any change or changes may be made in materials, construction and arrangement of parts, consistent with the spirit of the invention and within the scope of the subjoined claims.

Having thus described my invention, what I claim as new is:

1. The combination with a vehicle top of a support block secured in the top, a bearing block on the upper side of the top, a bearing block on the underside of the top, said top, said support block, and said bearing blocks having registered openings therethrough, a tubular standard rotatably mounted through the top, support block and bearing blocks, bearing means on the tubular standard for rotatable engagement with the bearing blocks for preventing longitudinal shifting of the standard, a lamp casing mounted on the upper end of the standard above the top, and operating means on the lower end of the standard within the vehicle for rotating the standard.

2. The combination with a vehicle top of a support block secured in the top, a bearing block on the upper side of the top, a bearing block on the underside of the top, said top, said support block, and said bearing blocks having registered openings therethrough, a tubular standard rotatably mounted through the top, support block and bearing blocks, bearing means on the tubular standard for rotatable engagement with the bearing blocks for preventing longitudinal shifting of the standard, a lamp casing mounted on the upper end of the standard above the top, and operating means on the lower end of the standard within the vehicle for rotating the standard, said lamp casing and operating means being tiltably mounted, and connection means between the operating means and the lamp casing extending through the tubular standard.

3. The combination with a lamp casing of a tubular standard adapted to traverse and be supported by a vehicle top, said lamp casing being tiltably mounted on the standard, above the top, a tiltable operating member carried by the standard below the top, and an operating connection between the operating member and the lamp casing extended through the tubular standard.

4. The combination with a lamp casing of a tubular standard adapted to traverse and be supported by a vehicle top, said lamp casing being tiltably mounted on the standard, above the top, a tiltable operating member carried by the standard below the top, and an operating connection between the operating member and the lamp casing extended through the tubular standard, said operating connection being rigid and pivotally connected to the lamp casing and to the operating member.

5. The combination with a lamp casing of a tubular standard adapted to traverse and be supported by a vehicle top, said lamp casing being tiltably mounted on the standard above the top, a tiltable operating member carried by the standard below the top, and an operating connection between the operating member and the lamp casing extended through the tubular standard, and means rotatably mounting the tubular standard in the vehicle top enabling rotating of the lamp casing by rotating the operating member.

6. The combination with a lamp casing of a tubular standard adapted to traverse and be supported by a vehicle top, said lamp casing being tiltably mounted on the standard above the top, a tiltable operating member carried by the standard below the top, and an operating connection between the operating member and the lamp casing extended through the tubular standard, and means rotatably mounting the tubular standard in the vehicle top enabling rotating of the lamp casing by rotating the operating member, said lamp casing comprising a hollow body, a spotlight in one end thereof, a direction signal in the other end and in the sides thereof, separate lamps for illumining the spotlight and direction signal, and separate light control means located on said operating member.

7. The combination with a lamp casing of a tubular standard adapted to traverse and be supported by a vehicle top, said lamp casing being tiltably mounted on the standard, above the top, a tiltable operating member carried by the standard below the top, and an operating connection between the operating member and the lamp casing extended through the tubular standard, said operating member comprising a body in pistol form for indicating the position of the lamp and enabling accurate aiming and directing of the lamp.

8. The combination with a lamp casing of a tubular standard adapted to traverse and be supported by a vehicle top, said lamp casing being tiltably mounted on the standard above the top, a tiltable operating member carried by the standard below the top, and an operating connection between the operating member and the lamp casing extended through the tubular standard, and means rotatably mounting the tubular standard in the vehicle top enabling rotating of the lamp casing by rotating the operating member, said operating member comprising a body in pistol form for indicating the position of the lamp and enabling aiming and directing the lamp.

9. The combination with a lamp casing of a tubular standard adapted to traverse and be supported by a vehicle top, said lamp casing being tiltably mounted on the standard above the top, a tiltable operating member carried by the standard below the top, and an operating connection between the operating member and the lamp casing extended through the tubular standard, and means rotatably mounting the tubular standard in the vehicle top enabling rotating of the lamp casing by rotating the operating member, said operating member comprising a body in pistol form for indicating the position of the lamp and enabling aiming and directing the lamp, said lamp casing comprising a hollow body, a spotlight in one end thereof, a direction signal in the other end and in the sides thereof, separate lamps for illumining the spotlight and direction signal, and separate light control means located on the pistol body.

10. The combination with a vehicle top having an opening therein, of a bearing located in the opening, a tubular standard extending through the bearing and rotatably carried by the bearing, a tiltably mounted lamp casing connected for rotation with a portion of the standard above the roof, operating means on a portion of the standard below the roof for rotating the standard, said operating means being mounted on the standard so as to be rockable, connection means connected between the operating means and the lamp casing, whereby the lamp casing may be simultaneously tilted and rotated by manipulating the operating means.

11. The combination with a vehicle top having an opening therein, of a bearing located in the opening, a tubular standard extending through the bearing and rotatably carried by the bearing, a tiltably mounted lamp casing connected for rotation with a portion of the standard above the roof, operating means on a portion of the standard below the roof for rotating the standard, said operating means being mounted on the standard so as to be rockable, connection means connected between the operating means and the lamp casing, whereby the lamp casing may be simultaneously tilted and rotated by manipulating the operating means, said connection means being extended through the tubular standard.

FRIEDA M. MILLER.